Sept. 24, 1935.  R. J. WARD  2,015,170
APPARATUS FOR AND METHOD OF ILLUMINATING SURFACES
Filed Feb. 9, 1934  2 Sheets-Sheet 1
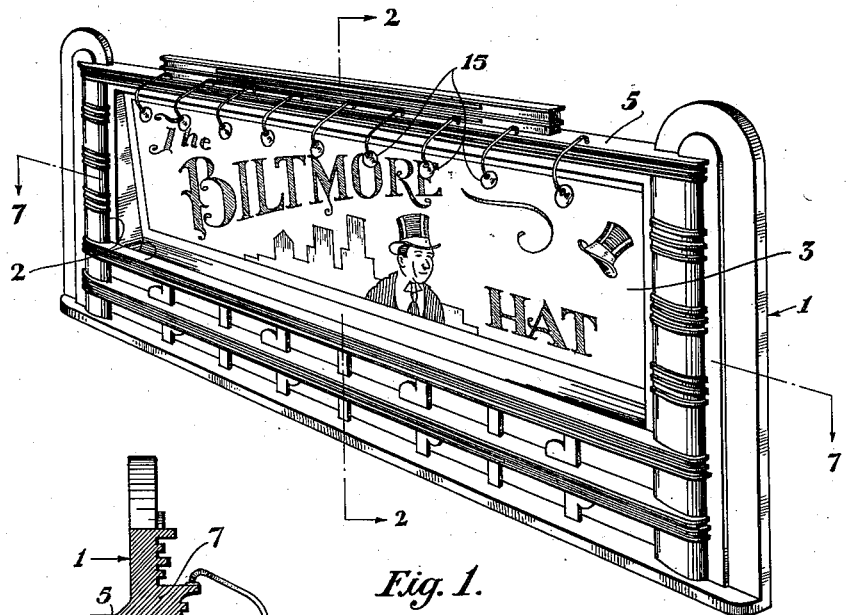
Fig. 1.
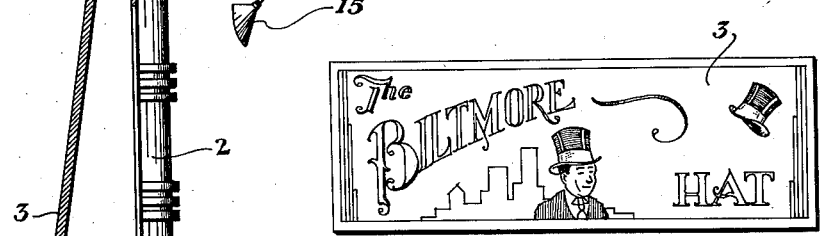
Fig. 2.
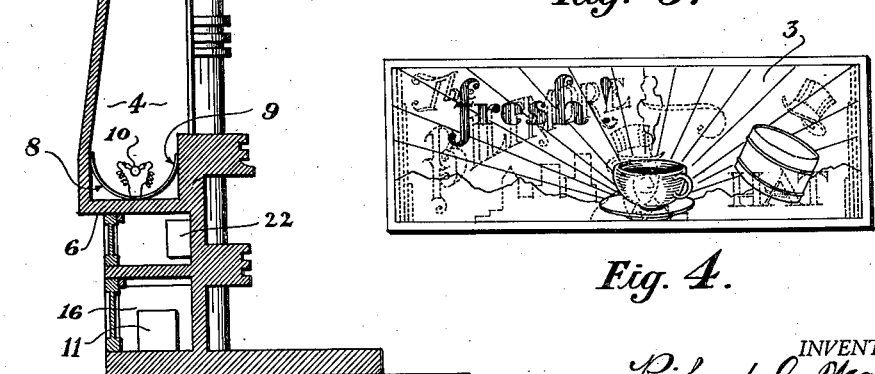
Fig. 3.
Fig. 4.
INVENTOR.
Richard J. Ward.
BY
ATTORNEYS.

Sept. 24, 1935.  R. J. WARD  2,015,170
APPARATUS FOR AND METHOD OF ILLUMINATING SURFACES
Filed Feb. 9, 1934   2 Sheets-Sheet 2

INVENTOR.
Richard J. Ward
BY
ATTORNEYS.

Patented Sept. 24, 1935

2,015,170

UNITED STATES PATENT OFFICE 2,015,170

APPARATUS FOR AND METHOD OF ILLUMINATING SURFACES

Richard J. Ward, Los Angeles, Calif., assignor to Multiraylite, Inc., a corporation of California Application February 9, 1934, Serial No. 710,504

7 Claims. (Cl. 40—130)

My invention relates to and has for an object the provision of an apparatus and method for illuminating surfaces embodying works of art, paintings, advertisements such as are provided on outdoor bill boards and the like, ceilings, walls and decorative panels, which is capable of use either in connection with or apart from systems of illumination utilizing daylight or artificial light, and comprehends, in its broadest aspects, the coating of a surface in whole or in part with a pigment or lacquer which carries crystals of predetermined character in suspension, and the diffusion of rays of light of short wave length and beyond the visible spectrum, such as ultra violet rays, on the surface so treated, thereby producing a fluorescent illumination of the surface upon which the light is directed.

Moreover, it is the purpose of this invention to provide a means and method of adaptation to commercial and practical use of the well known fluorescent properties of certain elements when said elements are excited by incident rays such as the ultra violet rays of the invisible spectrum.

At one or more margins of the area to be illuminated I provide one or more mercury vapor lights which embody elongated quartz tubes impregnated or coated with a suitable material, such as nickel cobalt, which serves as a filter against the transmission of all but ultra violet rays of light of a predetermined wave length, for diffusion on the surface of the recessed panel, or panels. I also employ a reflector for each of the lights, which has a reflecting surface capable of diffusing the rays of light from the source, and for such a purpose is etched by acids instead of being polished as in the case of usual reflectors.

The panels may have decorative designs thereon in natural colors, or blends thereof, which present usual effects on the eye under daylight or artificial light, and superposed designs in clear lacquer, which serves as a vehicle for carrying crystals of certain fluorescent elements which, when excited by incident rays, such as ultra violet, will illuminate the superposed designs, and thereby obscure the designs in natural colors, when the daylight or artificial light is discontinued and ultra violet light is projected thereupon.

My system of illumination is readily applicable to bill boards and outdoor advertising media, in daylight or artificial light, and when so used lends spectacular and striking effects to otherwise generally dead or dull decorations or designs.

In combining my improved system of illumination with ordinary means for artificially illuminating surfaces, I may provide a primary design, in natural colors of the visible spectrum which will react to the projection of daylight or artificial light thereon, and superpose a secondary design, formed with a transparent lacquer impregnated with colorless crystals of certain elements, which will not appear under daylight or artificial light but which, under excitement of ultra violet rays, will fluoresce and more or less completely obscure the primary design in natural colors, depending upon the hour of the day, the position of the sun in daylight, or the positions of interfering artificial lights in the night-time.

The dual system of illumination may be effected by a clock controlled mechanism which will alternately close the electric circuit of the artificial lights for the primary design and the mercury vapor lights for the secondary design; only one of said circuits being closed during the same interval.

A subsidiary object of this invention is to provide means for interconnecting and arranging all of the necessary elements of the system herein contemplated in a compact form, and in combination, for producing the results enumerated. Still other objects may appear as the description of my invention progresses.

I have shown in the accompanying drawings a preferred embodiment of my invention as employed for the purpose of illuminating outdoor bill boards, in which:

Fig. 1 is a perspective view of a bill board, or advertising structure of ornamental appearance and particularly arranged for the practice of my improved method of illumination;

Fig. 2 is a sectional elevation of the same on line 2—2 of Fig. 1;

Fig. 3 is a face view of the display panel of the bill board showing a primary design in colors of the visible spectrum formed thereon;

Fig. 4 is a similar view of the panel showing a superposed secondary design over the primary design, with the primary design shown in broken lines;

Figure 5:
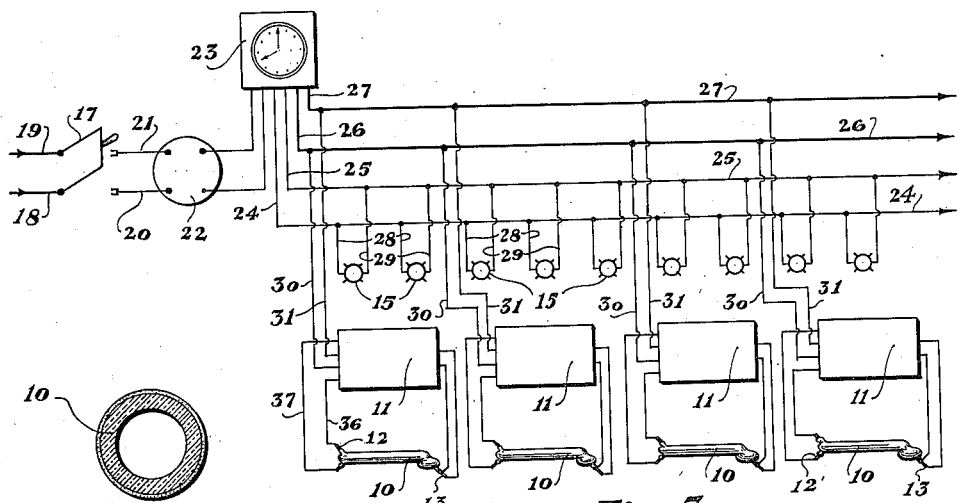
Fig. 5 is a circuit diagram showing the electrical connections between the several electrical elements of the apparatus.
Figure 8:
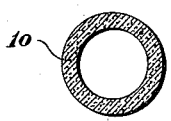
Fig. 8 is a cross sectional view of a quartz tube embodied in one of the mercury vapor lamps and coated with a suitable filtering element for preventing the projection of all but ultra violet light from the lamp.

Briefly described, my apparatus comprises a suitable structure, or frame 1 with an elongated opening 2 in the front thereof and one or more recessed panels 3 rearwardly of said opening and visible therethrough. Preferably the panel 3 is tilted forwardly at its top. Said panel forms the back of a compartment which has a top 5 and a bottom 6, thereby providing an encompassing shadow box for the decorated panel 3 for preventing, as far as possible, the interference of external and foreign light rays with the light projected upon the panel for illuminating the designs thereon.

At the top of the opening 2 I provide a longitudinal member 7 which while decorative in character may project from the front of the structure 1 sufficiently to form a canopy, thereby shading the panel 3 from the direct rays of the sun in daylight. At the bottom of the compartment 4 and preferably below the lower margin of the opening 2 I provide a reflector 8 of arcuate cross section, the particular form of which is such that it will be best adapted to reflect the rays of light upon the tilting or concave surface of the panel 3.

I prefer to form the reflector 8 of aluminum which is abraded or sandblasted on its inner reflecting surface 9 for more perfectly reflecting the rays of ultra violet light upon the decorated panel 3 than is possible with the usual highly polished reflectors. Within the compartment 4 and obscured from view from the exterior of the structure I provide a plurality of substantially elongated mercury vapor lamps 10, 10, etc. of well known character and form except for such variations from standard practice and usage as may be herein mentioned.

Figures 6, 9:
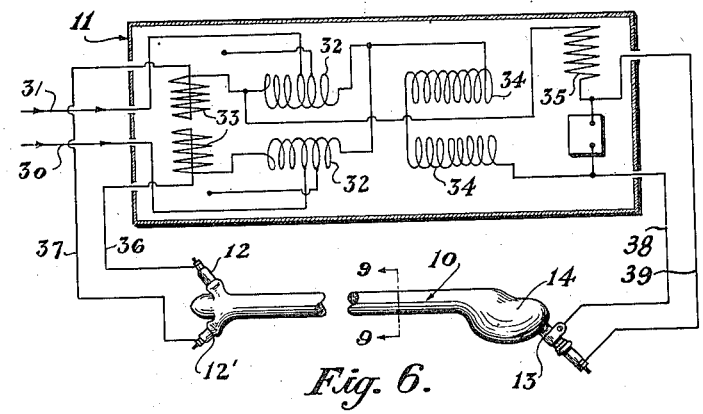
Fig. 6 is a circuit diagram showing a unitary lighting circuit embodying a single mercury vapor lamp and the necessary apparatus therefor.
Fig. 9 is a similar section of the quartz lamp showing the filtering element impregnated in the body of the tube, as a filtering means.
Figure 7:
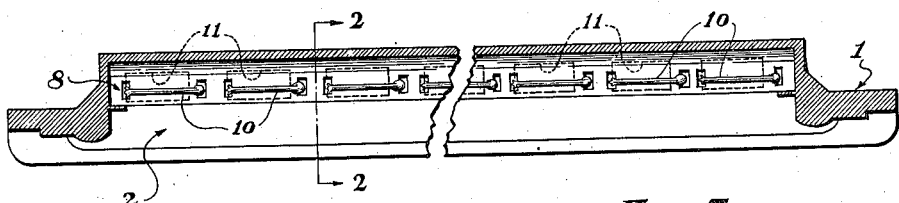
Fig. 7 is a sectional plan of the structure on line 7—7 of Fig. 1.

Each of the lamps 10 has an auxiliary unit 11 embodying electrical elements, including a transformer, resistance, inductance coils etc. for the purpose of rendering the lamps operative on alternating or direct current, as indicated in Fig. 6. Said auxiliary units are commercially obtainable and are not of my invention. It will be noted, however, that each of the lamps 10 has a pair of anodes 12 and 12' and a single cathode 13, by means of which the lamps are continuously energized when connected with a source of alternating current. Said lamps are formed with substantially elongated tubular bodies of quartz rather than of glass or other material, for the reason that quartz will not fatigue under continuous operation for long periods, whereas glass, for instance, will not transmit the ultra violet or other rays of the invisible spectrum after slight use.

In order to obviate the necessity for the well known "Woods" filters I prefer to fuse into the bodies of the lamp tubes 10 a sufficient quantity of a suitable element, such as nickel cobalt, uniformly distributed throughout the tubes and providing a filter which is self contained in, rather than separate from, the lamps. The amount of filtering material used in the lamp bodies may be varied but usually I provide a sufficient quantity to materially decrease if not to quite completely dim the illumination of the lamps so that the lamps may not be seen from points externally of the structure 1.

The lamps 10 are alined longitudinally in the bottom of the compartment 4 with proper relation to the reflector 8 so that the rays from the lamps will be directed from different points on the reflector to the decorated surface of the panel 3. The panel 3 is tilted, as shown, or may be made of slightly concave form if desired, in order to more conveniently and directly project the light rays from the lamps 10 and the reflector 8 to all portions of the panel surface, thereby providing uniform illumination of all portions of the design on the panel.

As usual in mercury vapor lamps enlarged bulbs 14 are provided at an end of the bodies 10, in which bulbs a quantity of mercury is held for vaporization upon the energization of the lamps.

As shown in Figs. 1 and 5 I may provide a plurality of ordinary electric lamps 15, 15, etc. for flooding the face of the panel 3 with artificial light of usual character, but such additional lamps are required only when a dual system of illumination is provided for on the structure 1.

At a suitable point below the compartment 4 I may provide an enclosure 16 for the reception of a meter, main switch, fuses and other necessary equipment, including the auxiliary units 11 used in connection with the mercury vapor lamps 10. The connections for a dual system of illumination are shown in diagram in Fig. 5 which I will now describe.

A main switch 17 serves to connect line wires 18 and 19 with lead in wires 20 and 21, respectively. A meter 22 is suitably connected in the circuit of the wires 20 and 21 and said wires lead to a clock operated switch device 23 of commercial character. From the clock switch 23 two circuits composed of wires 24 and 25 and 26 and 27, lead respectively, to the lamps 15 and the mercury vapor lamps 10. The series of flood lights 15 are connected in parallel with the wires 24 and 25 by means of wires.

Each of the auxiliary units 11 connected with the mercury vapor lamps is connected with the wires 26 and 27 by means of branch wires 30 and 31 which lead to and are arranged for connection with a transformer 32 included in the unit 11. The auxiliary units 11 also include resistances 33, inductance coils 34 and shifter resistances 35, which elements are interconnected as shown in Fig. 5 in a well known manner.

Wires 36 and 37 lead from the units 11, in each case, to the anodes 12 and 12' of each lamp 10, and wires 38 and 39, in each case, lead from the cathodes 13 to the inductance coils 34 and the shifter resistance 35, respectively.

The clock controlled switch 23 may be arranged so as to close the circuits of the lamps 10 and 15, alternately, and maintain said circuits closed for predetermined periods of time, so that at no time will the visible rays from the flood lights 15 be projected on the panel 3 while the invisible rays from the lamps 10 are directed thereupon.

Now, referring to Fig. 3, I have shown the face of the panel 3 decorated with a primary design formed with a pigment of different natural colors which are visible under daylight or artificial light. In Fig. 4 I have shown a secondary design superposed on the primary design and formed with a transparent lacquer having in suspension a profusion of crystals of certain elements which, when subjected to ultra violet rays will fluoresce or diffuse the rays of predetermined colors of the spectrum.

Thus, the material of which the superposed design is formed being, under natural or artificial light, transparent and colorless, the colors of the primary design will be luminous under daylight or artificial light, while the secondary design will be invisible under such light. But, when the secondary design is shaded from the direct rays of the sun and artificial light is discontinued and the lamps 10 are energized, the projection of the ultra violet rays upon the face of the panel 3 will render the secondary design luminous to the extent of almost, if not quite completely, obscuring the colors of the primary design.

The panel 3 is recessed for the purpose of providing a shadow box therearound which will prevent as far as possible, the projection of direct rays of sunlight or artificial light upon the decorated surface thereof, though the secondary design is more or less clearly visible, depending upon the position of the sun, in the daytime.

The fluorescent properties of certain elements are well known but in order to indicate the possibilities of my method and apparatus for producing artistic decorative panels and the illumination thereof, reference is had to the following list of materials which may be used for producing different colors under the influence of ultra violet light:

| Color desired | One part | One hundred parts |
| --- | --- | --- |
| Red | Bismuth sulphate | Calcium sulphate. |
| Blue | Bismuth oxide | Calcium oxide. |
| Green | Manganese sulphate | Calcium sulphate. |
| Yellow | Antimony oxide | Calcium oxide. |
| Orange | Uranium | Collodion. |

Crystals of the above and other elements which are held in suspension in a suitable transparent vehicle for producing the superposed designs must of course be insoluble in the vehicle. Any suitable vehicle may be used, such as shellac, collodion, clear lacquer, etc.

It will be understood that the desirability of my invention is not decreased by the use of the lamps 10 apart from the artificial lighting system including the lamps 15, for even in daytime, especially when the daylight is controlled or prevented from direct projection upon the decorated panel 3, the design will be sufficiently illuminated by means of the ultra violet rays from lamps 10 to provide a pleasing and satisfactory result. The use of the dual system, however, adds somewhat to the attractiveness of the display advertising, in that two different designs are alternately illuminated and the flashing of the lights when the change is made from one to the other of the designs serves to attract the attention of passers-by to the advertisements displayed.

What I claim is:

1. An apparatus for illuminating surfaces comprising a frame having a panel bearing an artistic design formed with a paint or the like containing elements which when subjected to rays of shorter wave length than the rays of the visible spectrum will radiate the different colors of said design, a mercury vapor lamp arranged at a margin of said panel, and embodying a quartz tube impregnated with an element for filtering rays from said lamp so as to project upon said panel only rays of predetermined wave length, and a reflector adjacent said source of light and provided with an etched reflecting surface, for diffusing the rays reflected therefrom.

2. An apparatus for illuminating surfaces by the projection of invisible rays thereon, comprising a frame having a recessed panel bearing an artistic design formed with paint or the like containing fluorescent crystals of different characters which when subjected to rays of shorter wave length than the rays of the visible spectrum will radiate the different colors of the design, a mercury vapor lamp including a quartz tube impregnated with an element for filtering and preventing all but the rays of desired wave length from diffusion on said panel, and means on said frame completely surrounding said panel for preventing the direct projection of interfering light rays upon the panel.

3. An apparatus for illuminating surfaces comprising a frame having a panel bearing a decorative design formed with fluorescent elements which react to invisible rays of given wave length for radiating the colors of said design, a unitary mercury vapor lamp and filter including an elongated quartz tube impregnated with an element impervious to all but rays of said given wave length for producing the desired color effects, and a reflector having an etched reflecting surface adjacent said lamp for diffusing the rays upon said panel.

4. An apparatus for illuminating surfaces comprising a frame having a decorative panel bearing a primary design, and a secondary design formed with elements which luminesce only in response to an incident light of given wave length beyond the visible spectrum, means for artificially lighting said primary design while said secondary design remains invisible, and means for directing light of said given wave length upon and for illuminating said secondary design while said primary design remains obscured.

5. An apparatus for illuminating surfaces comprising a frame having a panel bearing a primary design responsive to sunlight and artificial light, and a secondary design invisible in sunlight and artificial light and responsive only to light of given wave length beyond the visible spectrum, a source of light including a mercury vapor quartz tube carrying an element which is impervious to all light but that of said given wave length, means for diffusing light from said source upon and for illuminating said secondary design in predetermined colors, and means for alternately opening and closing the circuit of said source of light, for alternately illuminating said primary and secondary designs.

6. An apparatus for illuminating surfaces comprising a frame having a panel bearing a primary design responsive to artificial light and a secondary design formed with elements which are responsive only to light of a given wave length beyond the range of the visible spectrum, separate sources of light for said primary and secondary designs, and means controlling said separate sources of light for alternately illuminating said associated designs for predetermined periods of time.

7. An apparatus for illuminating surfaces comprising a frame having a panel bearing a primary design visible in daylight and artificial light, and a secondary design invisible in daylight and in ordinary artificial light but visible in light of predetermined wave length beyond the range of the visible spectrum, and separate sources of light for said primary and secondary designs, each arranged at a margin of said panel for projecting light upon said panel, means for preventing the direct projection of foreign and interfering light upon said panel, and means for diffusing the light upon said secondary design.

RICHARD J. WARD.